United States Patent [19]

Elefritz et al.

[11] Patent Number: 4,609,724
[45] Date of Patent: Sep. 2, 1986

[54] PROCESS FOR PREPARING AND PURIFYING ALKOXYPHOSPHAZENE POLYMER

[75] Inventors: Robert A. Elefritz, Ordmond Beach, Fla.; William M. Cole, Norton, Ohio; Charles R. Johnson, Hot Springs Village, Ark.

[73] Assignee: The Firestone Tire & Rubber Company, Akron, Ohio

[21] Appl. No.: 730,410

[22] Filed: Apr. 29, 1985

[51] Int. Cl.$^4$ .............................................. C08G 79/04
[52] U.S. Cl. .................................. 528/399; 524/476; 524/610; 528/497; 528/498
[58] Field of Search .................. 528/399, 497, 498; 524/476, 610

[56] References Cited

U.S. PATENT DOCUMENTS

| | | | |
|---|---|---|---|
| 3,972,841 | 8/1976 | Cheng et al. | 528/399 X |
| 4,128,710 | 12/1978 | Fieldhouse et al. | 528/399 X |
| 4,129,529 | 12/1978 | Fieldhouse et al. | 528/399 X |
| 4,237,263 | 12/1980 | Allcock et al. | 528/399 |
| 4,357,458 | 11/1982 | Antkowiak et al. | 528/399 X |
| 4,477,656 | 10/1984 | Longo et al. | 528/487 |

Primary Examiner—Harold D. Anderson
Attorney, Agent, or Firm—Frank J. Troy, Sr.

[57] ABSTRACT

Alkoxyphosphazene polymer is prepared in a homogeneous system by admixing chloropolymer dissolved in cyclohexane or a mix of cyclohexane and $C_5$–$C_7$ alkane with alkali metal alkoxide dissolved in tetrahydrofuran, reacting, desalting the resulting reaction solution and concentrating by a first step involving admixing non-solvent which is cyclohexane (and/or $C_5$–$C_7$ alkane if that is also present in the reaction solution) to cause coagulation thereby forming a higher viscosity rubber phase enriched in polymer and a lower viscosity liquid phase depleted in polymer and separating the rubber and liquid phases and a second step involving evaporating the residual solvent and non-solvent. The first concentrating step is preferably carried out utilizing an extruder.

16 Claims, 1 Drawing Figure

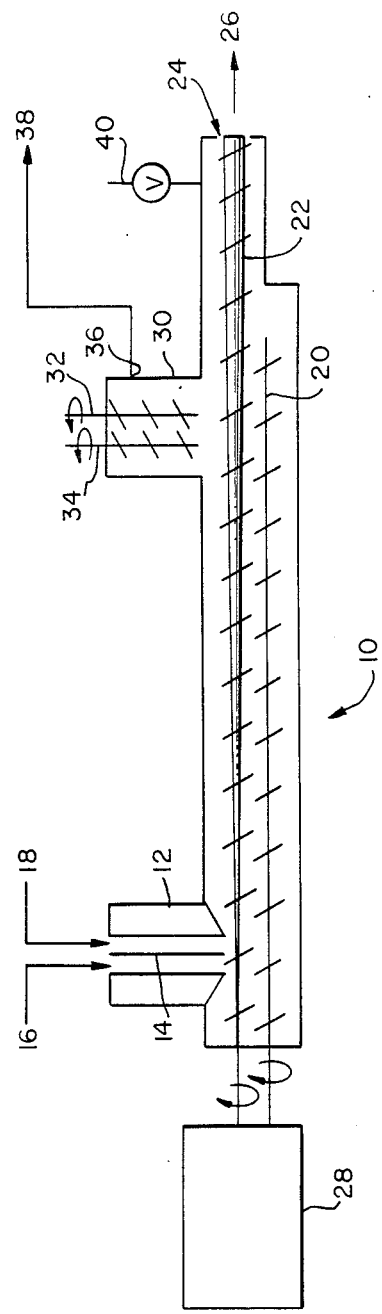

PROCESS FOR PREPARING AND PURIFYING ALKOXYPHOSPHAZENE POLYMER

TECHNICAL FIELD

This invention is directed to preparing alkoxyphosphazene polymer in a homogeneous system and involves removing solvent to concentrate the polymer product.

BACKGROUND OF THE INVENTION

Preparation of phosphazene rubbers normally involves preparation and purification of dichlorophosphazene $(NPCl_2)_n$ oligomers, e.g. wherein n ranges from 3 to 9, polymerization of the oligomer to a higher linear polymer (e.g. with a degree of polymerization ranging from about 20 to about 50,000) which is denoted chloropolymer, purification of the chloropolymer, and reaction of the purified chloropolymer to impart desirable properties.

In one type of reaction of chloropolymer to impart desirable properties, said chloropolymer is reacted with alkali metal alkoxide which may be fluorine substituted to replace chlorine in the polymer with alkoxy and/or fluoroalkoxy. The term alkoxyphosphazene polymer is used herein to denote the polymer reaction product regardless of whether its substituents are alkoxy or fluoroalkoxy or both. A by-product of the reaction is alkali metal chloride. This reaction is well known. See, for example, Shibuta et al. U.S. Pat. No. 4,446,295; Antkowiak et al. U.S. Pat. No. 4,357,458; Allcock et al. U.S. Pat. No. 4,237,263; Fieldhouse et al. U.S. Pat. No. 4,129,529; Fieldhouse et al. U.S. Pat. No. 4,128,710 and Rose U.S. Pat. No. 3,515,688.

It is desirable to carry out the chlorine replacement reaction in a homogeneous system, i.e. using solvents such that the polymer reaction product remains dissolved in the reaction solvent(s). Use of such a homogeneous system improves the reaction kinetics of the chloride replacement reaction. This concept is known from Allcock et al. U.S. Pat. No. 4,237,263 and Fieldhouse et al. U.S. Pat. Nos. 4,129,529 and 4,128,710 where tetrahydrofuran is used as the sole solvent.

It is also possible to obtain a homogeneous system using a combination of solvents for the reactants, i.e. tetrahydrofuran as a solvent for the alkoxide reactant and also either cyclohexane or cyclohexane plus $C_5$–$C_7$ alkane as a solvent for the chloropolymer reactant where the volume ratio of tetrahydrofuran to the other solvents exceeds about 1.00:1. This allows the chloropolymer to be dissolved in cyclohexane or in cyclohexane plus $C_5$–$C_7$ alkane for admixture with alkoxide dissolved in tetrahydrofuran for reaction. This is advantageous over admixing the chloropolymer dissolved in tetrahydrofuran because there is a potential reaction between the chloropolymer and tetrahydrofuran.

This homogeneous system which relies on tetrahydrofuran and cyclohexane and optionally on $C_5$–$C_7$ alkane undergoes reaction to provide a reaction solution wherein the formed alkoxyphosphazene polymer is in solution in the tetrahydrofuran/cyclohexane/optionally alkane, and the alkali metal chloride is colloidally dispersed in the solution. This reaction solution is purified by desalting and then removing the solvents. The desalting is readily carried out by treating with water plus surfactant. The solvent removal presents a problem if it is to be achieved economically. Evaporation is costly and tetrahydrofuran evaporates first so that the polymer coagulates and can trap some of said solvents. Coagulation by adding a non-solvent liquid avoids this problem.

SUMMARY OF THE INVENTION

It has been discovered herein that desalted alkoxyphosphazene polymer reaction solution containing alkoxyphosphazene polymer dissolved in tetrahydrofuran/cyclohexane/optionally $C_5$–$C_7$ alkane is concentrated from containing from about 5% to about 15% by weight normally solid material to a composition containing from about 50% to about 60% by weight normally solid material by admixing with the desalted reaction solution liquid non-solvent for the polymer which is cyclohexane and/or the same alkane as is present in the reaction solution in an amount sufficient to cause coagulation and formation of higher viscosity rubber phase enriched in alkoxyphosphazene polymer and a lower viscosity liquid phase depleted in alkoxyphosphazene polymer and recovering the rubber phase. The rubber phase which constitutes the concentrated product is readily purified of residual solvent and nonsolvent by evaporating such. The process herein avoids the heretofore mentioned disadvantages of concentrating the desalted reaction solution only by evaporation. It is a further advantage of the invention that material remaining in solution in the lower viscosity liquid phase contains any alkoxy-substituted oligomers, which are known to be detrimental to the properties of the desired rubber product.

While the cyclohexane and alkane are a solvent for chloropolymer reactant they are a non solvent for the alkoxyphosphazene polymer product. The polymer product, however, remains dissolved in the reaction solution formed on reaction of the chloropolymer and alkoxide because of the amount of tetrahydrofuran present which is a solvent for the polymer and the alkali metal chloride is colloidally dispersed in the polymer solution. As explained in more detail later, said admixture of cyclohexane and alkane non-solvents with the reaction solution makes it tetrahydrofuran deficient thereby causing coagulation.

The term "normally solid material" is used herein to mean the composition on a solvent free and liquid non-solvent free basis, i.e. the solids recovered on removal of the solvent and liquid non-solvent. The normally solid material in the desalted alkoxyphosphazene polymer reaction solution consists essentially of the alkoxyphosphazene polymer.

The terms "rubber phase" and "rubber phase enriched in alkoxyphosphazene polymer" mean the more viscous liquid, semi-solid or solid phase formed on coagulation of the polymer from solution and containing polymer in a greater weight percentage than the percentage of such polymer in the desalted reaction solution.

The terms "liquid phase" and "liquid phase depleted in alkoxyphosphazene polymer" mean the lower viscosity liquid phase that remains on formation of the rubber phase and containing at most a small weight percentage of polymer compared to the desalted reaction solution.

The process herein for preparing and purifying alkoxyphosphazene polymer comprises the steps of (a) admixing (i) linear dichlorophosphazene polymer dissolved in solvent consisting by volume of 100% to 80% cyclohexane and 0% to 20% $C_5$–$C_7$ alkane, and (ii) alkali metal alkoxide dissolved in tetrahydrofuran, the volume ratio of tetrahydrofuran to cyclohexane and $C_5$–$C_7$ alkane being at least 1.00:1, (b) reacting the linear dichlorophosphazene polymer and alkali metal alkoxide to form a reaction solution with alkoxyphosphazene polymer dissolved therein and with alkali metal chloride colloidally dispersed therein, (c) removing the alkali metal chloride to form a desalted reaction solution containing from about 5% to about 15% normally solid material dissolved therein, (d) admixing with the desalted reaction solution non-solvent which is cyclohexane and/or the alkane the same as that which formed part of the solvent for the dichlorophosphazene polymer in step (a) in an amount sufficient to cause coagulation thereby forming a higher viscosity rubber phase enriched in said polymer and a lower viscosity liquid phase depleted in said polymer and recovering rubber phase containing from about 50% to about 60% by weight normally solid material, (e) evaporating residual solvent and non-solvent from said recovered rubber phase.

Step (d) recited above is preferably carried out continuously and preferably comprises separately introducing into a concentrating zone a stream of the desalted reaction solution and a stream of the non-solvent(s) to be admixed to cause coagulation, i.e. cyclohexane and/or alkane, conveying the introduced streams toward a rubber phase discharge end of the concentrating zone to form an admixture of the streams thereby to cause coagulation and formation of the rubber and liquid phases with the rubber phase being sufficiently concentrated at the rubber phase discharge end of the concentrating zone to prevent exit of liquid phase from the rubber phase discharge, removing the liquid phase from the concentrating zone upstream of its rubber phase discharge end and recovering rubber phase containing from about 50% to about 60% by weight normally solid material at the rubber phase discharge end of the concentrating zone.

Very preferably the concentrating zone is formed by a screw type extruder equipped with a radial outlet communicating with a mechanical filter or other device for separation and removal of liquid phase and a downstream axial outlet for exit of rubber phase.

BRIEF DESCRIPTION OF THE DRAWING

The single FIGURE of the drawing schematically represents apparatus for use in carrying out the initial concentrating step herein.

DETAILED DESCRIPTION

The linear dichlorophosphazene polymer admixed in step (a) referred to above has a degree of polymerization ranging from about 20 to about 50,000. It normally has a dilute solution viscosity in toluene ranging from 0.6 to 1.6. It is well known in the art and is readily prepared by polymerizing cyclic oligomer, preferably trimer, by bulk or solution polymerization by methods well known in the art. Crude polymer is readily prepared as described, for example, in the following U.S. Pat. Nos.: Fieldhouse et al. 4,327,064; Reynard et al. 4,257,917; Fieldhouse et al. 4,226,840; Halasa et al. 4,225,567; Prichard et al. 4,137,330; Snyder et al. 4,123,503; Reynard et al. 4,005,171; Rose 3,515,688; and Allcock et al. 3,370,020. The crude polymer is readily purified to reduce the oligomer content therein as described, for example, in Tate et al. U.S. Pat. No. 3,755,537 or Fieldhouse et al. U.S. Pat. No. 4,226,840 or Fieldhouse et al. U.S. Pat. No. 4,327,064 or in the commonly assigned application titled "Continuous Process for Purifying Crude Linear Polydichlorophosphazene Polymer" filed concurrently herewith. Purified linear dichlorophosphazene polymer is preferably utilized in step (a).

The linear dichlorophosphazene polymer is preferably dissolved in cyclohexane for admixture in step (a). However in climates where the temperature falls below about 45° F. a solution of linear dichlorophosphazene in 100% cyclohexane can freeze. To lower the freezing point, up to 20% by volume of the cyclohexane is replaced by alkane having from 5 to 7 carbon atoms, such as pentane, hexane or heptane.

The alkali metal alkoxide used in admixing step (a) has the formula MOR wherein M is alkali metal selected from the group consisting of sodium, potassium and lithium and preferably is sodium and wherein R is selected from the group consisting of alkyl having from 1 to 12 carbon atoms and fluoroalkyl having from 1 to 12 carbon atoms. These are formed in known manner, for example, by reacting alkali metal with the appropriate aliphatic alcohol or fluoroaliphatic alcohol in tetrahydrofuran. Examples of aliphatic alcohols include methanol, ethanol, propanol, isopropanol, n-butanol, sec-butanol, hexanol, and dodecanol. Examples of fluoroaliphatic alcohols include trifluoroethanol; 2,2,3,3-tetrafluoropropanol; 2,2,3,3,3-pentafluoropropanol; 2,2,3,3,4,4,4-heptafluorobutanol; 2,2,3,3,4,4,5,5-octafluoropentanol; and 2,2,3,3,4,4,5,5,6,6,7,7-dodecafluoroheptanol. Mixtures of the foregoing alcohols can also be employed.

The alkali metal alkoxide is admixed in step (a) dissolved in tetrahydrofuran. This is convenient because the alkoxide is readily formed in tetrahydrofuran.

The volume ratio of the tetrahydrofuran to cyclohexane and any alkane should be at least 1.00:1 in order to assure the dissolving of the polymer formed in step (b). Preferably the volume ratio of tetrahydrofuran to cyclohexane plus alkane is at least 1.10:1 and optimally such ratio is 1.25:1. Normally the volume ratio of the tetrahydrofuran to cyclohexane plus alkane should not exceed 3:1 to obtain efficiency in the first concentrating step, i.e. step (d) referred to above and to allow for easier recovery and reuse of solvent and liquid non-solvent.

The reaction of step (b) is readily carried out, for example, at temperatures of 20°–110° C., preferably at 60° C., for about 5 to about 100 hours. In the reaction, alkoxide replaces chlorine in the linear polydichlorphosphazene polymer and alkoxyphosphazene polymer and alkali metal chloride are formed. Because of the solvent selection, a reaction solution results wherein the alkoxyphosphazene polymer is present in solution, i.e. in dissolved state, and the alkali metal chloride is colloidally dispersed therein. The alkoxyphosphazene polymer is represented by the formula

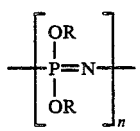

wherein n ranges from about 20 to about 50,000 and wherein the R's in the unit represented and along the polymer chain can be the same or different and are selected from the group consisting of $C_1$–$C_{12}$ alkyl and $C_1$–$C_{12}$ fluoroalkyl. The alkoxyphosphazene polymer which contains fluoroalkoxy substituents is sometimes referred to as phosphonitrilic fluoroelastomer.

In step (c), the reaction solution formed in step (b) is desalted, that is, is purified of the alkali metal chloride by-product. This desalting step is readily carried out by treating the reaction solution with water, i.e. by washing, preferably with water including a surfactant as described in Longo et al. U.S. Pat. No. 4,477,656, e.g. by pouring the reaction solution into a larger volume of water and separating the phases and repeating the procedure, if necessary, until desalting is essentially completed. Various coalescing media can be advantageously employed to aid in phase separation. The resulting desalted reaction solution contains from about 5% to about 15% by weight normally solid material consisting essentially of the alkoxyphosphazene polymer dissolved in liquid consisting of tetrahydrofuran, cyclohexane, and in the case where $C_5$–$C_7$ alkane has been used in step (a) in combination with cyclohexane, such $C_5$–$C_7$ alkane. The ratio of tetrahydrofuran, cyclohexane and alkane is substantially the same as in step (a).

Turning now to step (d), that is the step wherein the desalted reaction solution undergoes initial concentrating by removal of some of the liquid in which the alkoxyphosphazene polymer is dissolved, such step involves admixing the desalted reaction solution with an additional amount of cyclohexane and/or, optionally if the reaction solution contains alkane, an additional amount of the same alkane. As is indicated above, the cyclohexane and/or alkane is added in sufficient amount to cause coagulation. This occurs because the alkoxyphosphazene polymer is soluble in tetrahydrofuran but not in cyclohexane or alkane and addition of either or both of the layer two in sufficient amount causes the solution to be tetrahydrofuran deficient in respect to dissolving the alkoxyphosphazene polymer. Preferably, the cyclohexane and/or alkane is added so that the volume ratio of the cyclohexane and alkane added plus that in the desalted reaction solution to the tetrahydrofuran in the desalted reaction solution is at least 1.5:1 preferably at least about 1.8:1. Volume ratios of greater than about 4:1 normally require excessive use of solvent and liquid non-solvent and increased concentrating load and increased effort to recover solvent and liquid non-solvent for reuse.

A preferred concentrating zone herein for continuous concentrating in step (d) herein has inlets for separate introduction of streams of desalted polymer solution and of the non-solvent, i.e. of the cyclohexane and/or alkane added to cause coagulation, a restricted outlet for formed rubber phase at a downstream end, a filtering outlet for formed liquid phase upstream of the rubber phase outlet and conveying means extending between the inlets and the rubber phase outlet. Each of the inlet streams of desalted polymer solution and non-solvent can consist of one or a plurality of streams. While the streams of desalted polymer solution and of non-solvent are normally introduced concurrently, some of the non-solvent can be introduced as a counter-current stream.

As previously indicated, preferred apparatus forming the concentrating zone of step (d) is a screw type extruder having an outlet in the axial direction at its downstream end and an outlet in the radial direction upstream of said downstream end communicating with mechanical filtering means. Very preferably such apparatus is a twin screw extruder, i.e. an extruder having two longitudinally extending worms, a lower worm or screw extending from an inlet end to a location just downstream of the outlet to the mechanical filter and an upper worm or screw extending from the inlet end to the outlet at the downstream end and having a root diameter which progressively increases toward the downstream end to function as a constricting means at the downstream end. This constricting means functions in concert with the outlet at the downstream end to form a high pressure zone at said downstream end which exerts back pressure on the liquid phase and prevents it from leaving at the outlet at the downstream end and forces the liquid phase to leave out of said radial outlet. Such constricting means can function in concert with the downstream end to provide discharge of rubber phase in the form of an tubular stream which has increased surface area, compared to a solid cylindrical stream thus providing an advantageously larger surface area for evaporating step (e).

Other suitable apparatus for the concentrating zone of step (d) includes screw or flight or rotary vane conveying means and a restricted outlet and is equipped with a filtering outlet upstream of the restricted outlet.

The radial or filtering outlet communicates with a filtering means which is preferably a mechanical filter in the form of a radially extending tubular structure equipped with worms extending radially of the extruder or other means forming the concentrating zone and axially of said tubular structure wherein the worms rotate to force rubber phase and solid particles attempting to leave back into the concentrating zone while allowing liquid phase to leave via the tubular structure for recovery at a downstream end of the tubular structure. Alternatively, the filtering outlet can be equipped with a stationary filtering element or filtering media but this is less preferred as this embodiment requires periodic backwashing.

Turning now to the single FIGURE of the drawing which schematically depicts twin screw extruder means equipped with a mechanical filtering means for use as the concentrating zone of step (d), it depicts an extruder 10, having an inlet 12 equipped with a baffle 14 for separate introduction into the extruder of a desalted reaction solution stream 16 and a non-solvent stream 18. The extruder 10 contains screws 20 and 22 which extend longitudinally and are adapted to be rotated to feed in the direction of extruding outlet 24 for discharge of an annular stream 26 of rubber phase. The screw 22 has an increasing root diameter as depicted. The extruder is equipped with drive means 28 for rotating the twin screws 20 and 22. The extruder is also equipped with filtering means 30 which contains screws 32 and 34 which are adapted to be rotated by means not depicted to cause rubber phase and solid particles attempting to exit via means 30 to return to the barrel of extruder 10 to be carried by screw 22 toward outlet 24. The filtering means 30 has an outlet 36 for exit of liquid phase 38. Communicating with the inside of the extruder barrel between the outlet to means 30 and rubber phase outlet 24 is a valved line 40 through which non-solvent can be introduced countercurrently to backwash rubber phase.

In carrying out the concentrating step (d), desalted reaction solution and non-solvent streams 16 and 18 are separately introduced on respective sides of baffle 14 and enter the cavity in the barrel of extruder 10 wherein they are intermingled as they contact screws 20 and 22 which are being rotated by drive 28 and are conveyed toward outlet 24 by the screws. The intermingling and the mixing action provided by screws 20 and 22 cause polymer to coagulate and the formation of a higher viscosity rubber phase enriched in polymer and a lower viscosity liquid phase depleted in polymer. The formed liquid and rubber phases are conveyed toward outlet 24 and the coagulation and concentration of the rubber phase as it is conveyed toward the restriction at and on the way to outlet 24 as a result of the constriction provided by the increasing root diameter of screw 22 causes a high pressure zone to form at outlet 24 which exerts back pressure on the liquid phase and prevents liquid phase from exiting via 24. The rotating screws 20 and 22 causes rubber phase to leave via exit 24 in the form of an annular stream. The back pressure exerted on the liquid phase in concert with the conveying screws 20 and 22 and the feed stream pressure force the liquid phase into mechanical filter 30 which forces rubber phase and solid particles back into the extruder barrel and the liquid phase free of rubber phase and solid particles is forced out at 36 where it can be processed, e.g. by distillation to recover purified tetrahydrofuran, cyclohexane and alkane. In carrying out the process, the speed of rotation of screws 20 and 22 and the feed rate are readily adjusted to provide sufficient residence time for coagulation and concentration of polymer so that rubber phase blocks liquid phase from leaving at outlet 24.

As previously indicated, the rubber phase recovered in step (d) contains from about 50% to about 60% by weight normally solid material which consists essentially of alkoxyphosphazene polymer. Such rubber phase is readily treated in step (e) herein to further concentrate the polymer to provide composition which contains, for example, 98% by weight or more alkoxyphosphazene polymer. This further concentration is readily carried out by evaporating residual solvent and liquid non-solvent from the recovered rubber phase. This is readily carried out, for example, by utilizing an extruder drier fed, for example, from the rubber phase outlet of an extruder used for the first concentrating step. Such extruder drier can include conveying screws, a jacketed barrel for the circulation of hot water or steam, and means to cause a vacuum in the extruder barrel. The evaporation of solvent and liquid non-solvent from rubber phase is also readily carried out, for example, by forming a slurry of rubber phase in water and injecting steam to volatilize the solvent and non solvent.

The process herein is illustrated in the following working example.

EXAMPLE

Phosphononitrilic elastomer is prepared as follows: 116 lbs. of polydichlorophosphazene polymer having a dilute solution viscosity in toluene of 1.70 dissolved in 1472 lbs. of cyclohexane/pentane (85% by volume cyclohexane and 15% by volume pentane) are admixed with 377 lbs. of sodium alkoxides (made from ortho alkylphenol, trifluoroethanol and telomeric fluoroalcohols) dissolved in 1870 lbs. of tetrahydrofuran and the chloropolymer and alkoxide are reacted for 6 hours at 140° F. to provide a reaction solution containing 275 lbs. polymer (dilute solution viscosity in toluene of 1.5) dissolved therein and sodium chloride colloidally dispersed therein.

The reaction solution is desalted by extraction with an equal volume of water containing sulfated fatty acid ester surfactant (Dymsol PA available from Diamond Shamrock). After gravity settling and decanting, the remaining brine droplets in the polymer solution phase are removed by passage through a coalescing device which employs woven cotton elements. The desalted reaction solution contains by weight 7.7% normally solid material.

The desalted reaction solution is concentrated in a twin screw extruder as schematically depicted in the FIGURE of the drawing wherein each conveying screw has an outside diameter of 0.8 inches and wherein the root diameter of the top screw increases from about 0.5 inches at the inlet to 0.75 inches at the rubber phase outlet. Desalted reaction solution stream and non-solvent stream consisting of pentane are introduced at respective rates of 4.6 and 4.25 lbs. per minute to provide a weight ratio of cyclohexane and pentane to tetrahydrofuran in the combination of the two streams of 2.6:1 (equivalent to a volume ratio of about 1.94:1)

The streams are intermingled in the extruder and rubber phase coagulates and higher viscosity rubber phase enriched in polymer and lower viscosity liquid phase depleted in polymer are formed. The screws convey the coagulated rubber phase to the discharge end where a rubber phase seal is formed so as to block liquid phase from exiting with rubber phase and liquid phase is forced backward to exit via the mechanical filter. The rubber phase exiting contains 55% by weight normally solid material. The exiting liquid phase contains any alkoxy-substituted oligomers.

The rubber phase exiting as a tubular stream is directly routed into an extruder drier wherein residual tetrahydrofuran, cyclohexane and pentane are evaporated providing a concentrated product containing about 99.5% by weight normally solid material.

Other variations will be evident to those skilled in the art. Therefore, the scope of the invention is intended to be defined by the claims.

What is claimed is:

1. A process for preparing and purifying alkoxyphosphazene polymer comprising the steps of
(a) admixing linear dichlorophosphazene polymer dissolved in solvent consisting by volume of 100% to 80% cyclohexane and 0% to 20% $C_5$-$C_7$ alkane and alkali metal alkoxide dissolved in tetrahydrofuran, the ratio of tetrahydrofuran to cyclohexane and $C_5$-$C_7$ alkane being at least about 1.00:1, said linear dichlorophosphazene polymer having a degree of polymerization ranging from about 20 to about 50,000, said alkali metal alkoxide having the formula MOR wherein M is selected from the group consisting of sodium, potassium and lithium and wherein R is selected from the group consisting of alkyl having from 1 to about 12 carbon atoms and fluoroalkyl having from 1 to about 12 carbon atoms;
(b) reacting the linear dichlorophosphazene polymer and alkali metal alkoxide to form a reaction solution with alkoxyphosphazene polymer dissolved therein and with alkali metal chloride colloidally dispersed in the polymer solution,
(c) removing the alkali metal chloride to form a desalted reaction solution containing from about 5 to about 15% by weight normally solid material dissolved therein,
(d) admixing with the desalted reaction solution non-solvent selected from the group consisting of (i) cyclohexane, (ii) alkane the same as that which formed part of the solvent for the dichlorophosphazene polymer in step (a), and (iii) both cyclohexane and said alkane, in an amount sufficient to cause coagulation thereby forming a higher viscosity rubber phase enriched in said polymer and a lower viscosity liquid phase depleted in said polymer and recovering rubber phase containing from about 50% to about 60% by weight normally solid material;
(e) evaporating residual solvent and residual non-solvent from said recovered rubber phase.

2. A process for preparing and purifying alkoxyphosphazene polymer as recited in claim 1 wherein the nonsolvent admixed in step (d) provides in the admixture a volume ratio of cyclohexane and alkane to tetrahydrofuran of at least 1.5:1.

3. A process for preparing and purifying alkoxyphosphazene polymer as recited in claim 2 wherein the nonsolvent admixed in step (d) provides in the admixture a volume ratio of cyclohexane and alkane to tetrahydrofuran of at least about 1.8:1.

4. A process as recited in claim 3 wherein step (d) is carried out continuously and comprises separately introducing into a concentrating zone a stream of said desalted reaction solution and a stream of said nonsolvent, conveying the introduced streams along the concentrating zone toward a rubber phase discharge end to form an admixture of the streams and to cause coagulation and formation of said higher viscosity rubber phase and said lower viscosity liquid phase, said rubber phase being sufficiently concentrated at said rubber phase discharge end to prevent exit from said rubber phase discharge end of said liquid phase, removing said liquid phase from the concentrating zone at a location upstream of said rubber phase discharge end, recovering rubber phase containing from about 50% to about 60% by weight normally solid material at said rubber phase discharge end.

5. A process as recited in claim 4 wherein the concentrating zone comprises a screw type extruder.

6. A process as recited in claim 5 wherein the rubber phase is discharged from the extruder in the form of a tubular stream.

7. A process as recited in claim 5 wherein the screw type extruder includes constricting means.

8. A process as recited in claim 5 wherein said liquid phase is removed from the concentrating zone and separated from said rubber phase utilizing a mechanical filter wherein rotating means returns rubber phase back into the extruder and permits liquid phase to leave the extruder.

9. A process for concentrating desalted alkoxyphosphazene polymer reaction solution comprising alkoxyphosphazene polymer dissolved in liquid consisting of tetrahydrofuran and cyclohexane and of $C_5$-$C_7$ alkane replacing from 0% to 20% by volume of the cyclohexane in a volume ratio of tetrahydrofuran to cyclohexane and $C_5$-$C_7$ alkane of at least about 1.00:1, said solution containing from about 5% to about 15% by weight normally solid material dissolved therein, said process comprising the steps of admixing with the desalted reaction solution non-solvent selected from the group consisting of (a) cyclohexane, (b) the same alkane which is present in said liquid and (c) both cyclohexane and said alkane, in an amount sufficient to cause coagulation and formation of a higher viscosity rubber phase enriched in said polymer and a lower viscosity liquid phase depleted in said polymer, and recovering said rubber phase containing from about 50% to about 60% normally solid material.

10. A process as recited in claim 9 wherein the non-solvent which is admixed provides in the admixture a volume ratio of cyclohexane and alkane to tetrahydrofuran of at least 1.5:1.

11. A process as recited in claim 10 wherein the non-solvent which is admixed provides in the admixture a volume ratio of cyclohexane and alkane to tetrahydrofuran of at least about 1.8:1.

12. A process as recited in claim 11 wherein said concentrating process is carried out continuously and comprises separately introducing into a concentrating zone a stream of said desalted reaction and a stream of said nonsolvent, conveying the introduced streams along the concentrating zone toward a rubber phase discharge end to form an admixture of the streams and to cause coagulation and formation of said higher viscosity rubber phase and said lower viscosity liquid phase, said rubber phase being sufficiently concentrated at said rubber phase discharge end to prevent exit from said rubber phase discharge end of said liquid phase, removing said liquid phase from the concentrating zone at a location upstream of said rubber phase discharge end, recovering rubber phase containing from about 50% to about 60% by weight normally solid material at said rubber phase discharge end.

13. A process as recited in claim 12 wherein the concentrating zone comprises a screw type extruder.

14. A process as recited in claim 13 wherein the rubber phase is discharged from the extruder in the form of a tubular stream.

15. A process as recited in claim 13 wherein the screw type extruder includes constricting means.

16. A process as recited in claim 13 wherein said liquid phase is removed from the concentrating zone and separated from said rubber phase utilizing a mechanical filter wherein rotating means returns rubber phase back into the extruder and permits liquid phase to leave the extruder.

* * * * *